United States Patent [19]

Yasuda et al.

[11] Patent Number: 5,020,138
[45] Date of Patent: May 28, 1991

[54] RADIO COMMUNICATION APPARATUS HAVING COOLING MEANS

[75] Inventors: Hiroshi Yasuda; Satoshi Yokoya; Nobutaka Takao, all of Kanagawa, Japan

[73] Assignee: Sony Corporation, Tokyo, Japan

[21] Appl. No.: 500,507

[22] Filed: Mar. 28, 1990

[30] Foreign Application Priority Data

Apr. 3, 1989 [JP] Japan .................................. 1-84374

[51] Int. Cl.$^5$ ...................... H04B 1/04; H04B 17/00; H05K 7/20
[52] U.S. Cl. .................................. 455/115; 455/117; 455/128; 361/384; 379/437
[58] Field of Search .............. 455/115, 117, 127, 128, 455/217, 226, 343; 330/289, 298, 207 P; 379/429, 433, 437, 58; 340/584, 588; 361/379, 384

[56] References Cited

U.S. PATENT DOCUMENTS

| | | | |
|---|---|---|---|
| 4,158,180 | 6/1979 | Challen | 330/298 |
| 4,353,037 | 10/1982 | Miller | 330/298 |
| 4,724,400 | 2/1988 | Luettgenau | 330/295 |
| 4,939,786 | 7/1990 | McCallum et al. | 455/67 |

FOREIGN PATENT DOCUMENTS

| | | | |
|---|---|---|---|
| 2064264 | 10/1981 | United Kingdom | 379/437 |
| 2199467 | 7/1988 | United Kingdom | 455/117 |

Primary Examiner—Reinhard J. Eisenzopf
Assistant Examiner—Chi H. Pham
Attorney, Agent, or Firm—Ronald P. Kananen

[57] ABSTRACT

A radio communication apparatus has a modulating portion for modulating a carrier with a signal to be transmitting so as to produce a transmission signal. A signal transmitting portion causes the transmissible signal to be subjected to power amplification. The transmissible signal is transmitted after having been subjected to power amplification. A cooling device is provided for cooling by force a heat source contained in the signal transmitting portion in response to a condition detector for detecting a temperature condition or an operating condition of the signal transmitting portion. An operation control unit is operative to cause the cooling device to be in operation when a particular temperature condition in which temperature of the signal transmitting portion has exceeded a predetermined value or a particular operating condition in which the signal transmitting portion has been in a predetermined state is detected by the condition dectector.

19 Claims, 5 Drawing Sheets

RADIO COMMUNICATION APPARATUS HAVING COOLING MEANS

BACKGROUND OF THE INVENTION

1. Field of the Invention

The present invention relates generally to radio communication apparatus, such as a mobile radio telephone apparatus, and more particularly, to improvements in a radio communication apparatus which has a signal transmitting portion operative to cause a transmissible signal, which is produced by modulating a carrier with a signal to communicate, to be subjected to power amplification and then to transmit the transmissible signal having been subjected to the power amplification. Still more particularly, this invention relates to a controlled fan cooling system for the radio telephone apparatus of the type disclosed wherein the cooling system is responsive to an operative condition or to the temperature of the power amplifier.

2. Description of the Prior Art

In a public mobile telephone system which is one of a plurality of mobile radio communication systems, communications between an automobile on which a mobile radio telephone apparatus is mounted and an ordinary telephone subscriber or between automobiles each provided with the mobile radio telephone apparatus are carried out through a particular local base station. A radio communication apparatus constituting the mobile radio telephone apparatus used in the public mobile telephone system is operative to transmit and receive a speech signal selectively. In transmission of the speech signal by the mobile radio telephone apparatus, a transmissible signal is produced by, for example, frequency-modulating a predetermined carrier with the speech signal and then subjecting the modulated carrier to power amplification to be transmitted. Therefore, the radio communication apparatus constituting the mobile radio telephone apparatus is required to have a signal transmitting portion including a frequency-modulator for performing frequency-modulation in which the speech signal provides the part of a modulating signal to produce the transmissible signal and a power amplifier for causing the transmissible signal obtained from the frequency-modulator to be subjected to power amplification in advance of transmission.

The signal transmitting portion of the radio communication apparatus constituting the mobile radio telephone apparatus, which is provided with the power amplifier as described above, is put in a heat generating condition with a heat source constituted by the power amplifier when the power amplifier is in operation. Accordingly, in the previously-proposed radio communication apparatus constituting the mobile radio telephone apparatus, a chassis used in the signal transmitting portion of the apparatus is provided in the form of an aluminum alloy die-casting so that heat generated by the power amplifier is efficiently radiated through the chassis. Furthermore, many heat sink members are disposed around the power amplifier.

However, in the case of such previously-proposed radio communication apparatus, it is feared that a rise in temperature of the signal transmitting portion including the power amplifier is not sufficiently suppressed even by means of using the chassis provided in the form of an aluminum alloy die-casting and by disposing many heat sink members around the power amplifier. Therefore, a problem occurs in that the transmission of the transmissible signal is carried out under an unstable operating condition of the signal transmitting portion.

OBJECTS AND SUMMARY OF THE INVENTION

Accordingly, it is an object of the present invention to provide a radio communication apparatus provided with a signal transmitting portion wherein a transmissible signal produced by modulating a carrier with a signal to communicate is subjected to power amplification in advance of being transmitted, which avoids the aforementioned problem encountered with the prior art.

Another object of the present invention is to provide a radio communication apparatus provided with a signal transmitting portion wherein a transmissible signal produced by modulating a carrier with a signal to be communicated is subjected to power amplification in advance of being transmitted, in which transmission of the transmissible signal having been subjected to power amplification is carried out under a stable operating condition of the signal transmitting portion.

A further object of the present invention is to provide a radio communication apparatus provided with a signal transmitting portion wherein a transmissible signal produced by modulating a carrier with a signal to be communicated is subjected to power amplification in advance of being transmitted, in which the signal transmitting portion is efficiently and appropriately cooled in accordance with its operating condition so that its temperature is effectively prevented from rising and thereby to be stable.

According to the present invention, there is provided a radio communication apparatus comprising a modulating portion for modulating a carrier with a signal to be transmitted so as to produce a transmissible signal, a signal transmitting portion for causing the transmissible signal to be subjected to power amplification and then transmitting the transmissible signal having been subjected to power amplification, a cooling device operative o cool by force a heat source contained in the signal transmitting portion, a condition detector for detecting a temperature condition or an operating condition of the signal transmitting portion, and an operation control unit operative to cause the cooling device to be in operation when a particular temperature condition in which temperature of the signal transmitting portion has exceeded a predetermined value or a particular operating condition in which the signal transmitting portion has been in a predetermined state is detected by the condition detector.

In the radio communication apparatus thus constituted in accordance with the present invention, the heat source in the signal transmitting portion includes a power amplifier provided for amplifying the transmissible signal and the cooling device which is provided for cooling the heat source in the signal transmitting portion comprises, for example, a fan for cooling the power amplifier contained in the signal transmitting portion. In such a case, the fan is caused to operate when the temperature of the signal transmitting portion has exceeded the predetermined value or during a period of time from a time point at which a first predetermined period of time has passed since the signal transmitting portion commenced to transmit the transmissible signal to another time point at which a second predetermined period of time has passed since the signal transmitting portion terminated to transmit the transmissible signal.

With the cooling device thus operated, the heat source in the signal transmitting portion is appropriately cooled when it should be cooled. Therefore, the signal transmitting portion is efficiently and appropriately cooled by the cooling device so as to be effectively prevented from rising undesirably in temperature and thereby is stable. Consequently, the transmissible signal which has been subjected to power amplification in the power amplifier is transmitted under a stable operating condition of the signal transmitting portion.

The above, and other objects, features and advantages of the present invention will become apparent from the following detailed description which is to be read in connection with the accompanying drawings.

DESCRIPTION OF THE PREFERRED EMBODIMENTS

Figure 1:
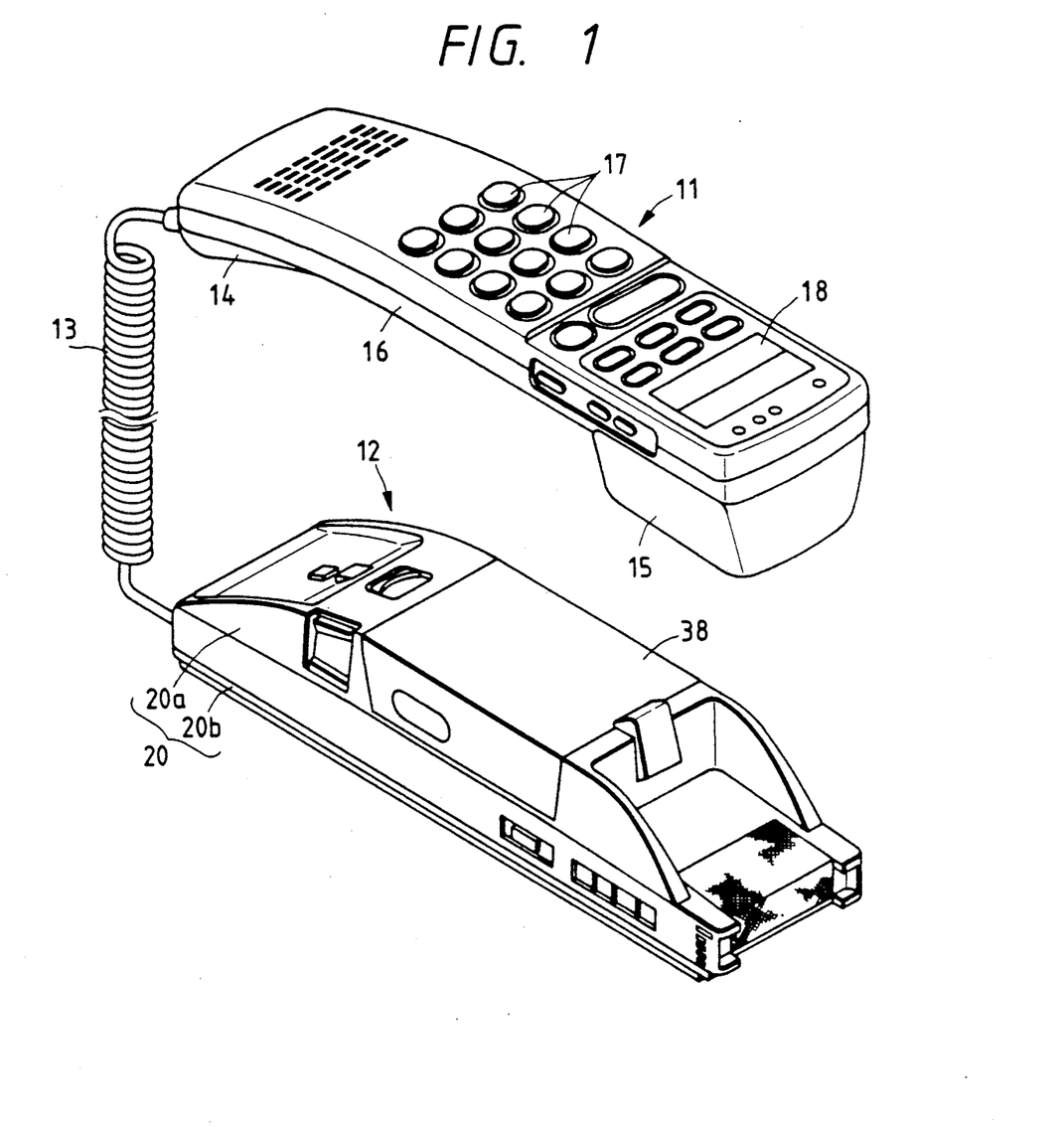
FIG. 1 is a perspective illustration showing an external view of an embodiment of radio communication apparatus according to the present invention.

FIG. 1 shows one embodiment of a radio communication apparatus according to the present invention, in which the apparatus constitutes a mobile radio telephone apparatus.

Referring to FIG. 1, the embodiment comprises a handset 11 and a cradle 12 to which the handset 11 is connected through an extendible cable 13. The handset 11 has a voice input portion 14 containing a microphone, a voice output portion 15 containing a speaker, and a grip portion 16 which interconnects the voice input portion 14 and the voice output portion 15. A plurality of push button switches 17 for dialing and a display portion 18 for displaying telephone numbers are provided on the grip portion 16. The cradle 12 is provided with a case 20 which is formed with upper and lower half bodies 20a and 20b to contain therein devices, parts and elements inclusively constituting a communicating circuit configuration.

Figure 2A:
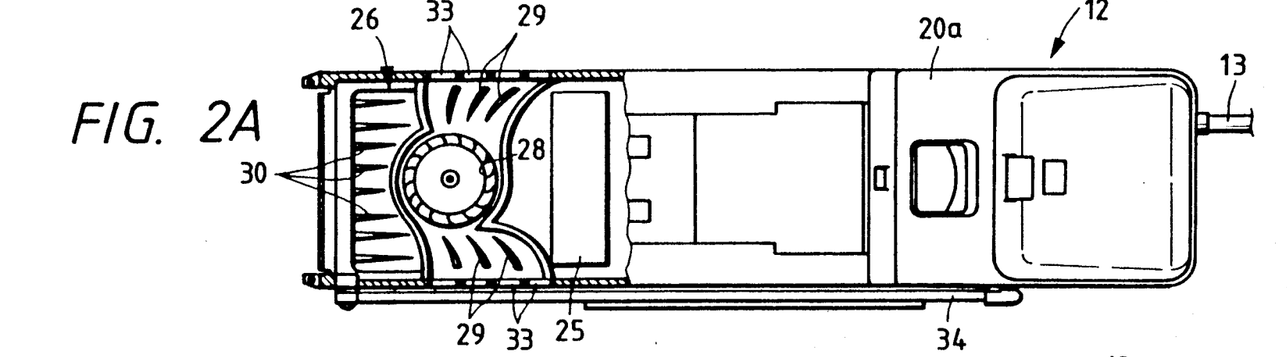
FIGS. 2A and 2B are partial fragmentary plan and side views respectively showing a part of the embodiment shown in FIG. 1.
Figure 2B:
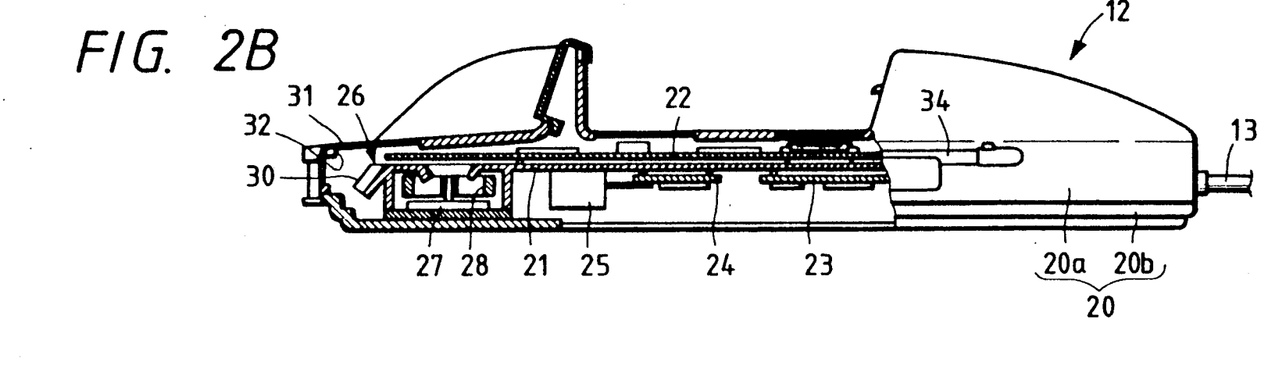

As shown in FIGS. 2A and 2B, within the case 20 of the cradle 12, a chassis 21 is disposed to be fixed for securing circuit boards 22, 23 and 24 attached to the chassis 21 both from above and from below. The chassis 21 is provided in the form of an aluminum alloy diecasting so that heat generated by the contained circuit elements and parts mounted on the chassis 21 is efficiently radiated through the chassis 21.

A power integrated circuit device 25 which includes circuit elements constituting a power amplifier in a signal transmitting portion is mounted on the chassis 21 with its electrodes connected to the circuit board 24. The chassis 21 also functions as a heat sink member for the power integrated circuit device 25. Further, a cooling portion 26 is provided on an end portion of the chassis 21 to be positioned in the vicinity of the power integrated circuit device 25. This cooling portion 26 comprises a fan 28 and fan motor 27 fixed on the chassis 21 for driving the fan 28. A plurality of cooling fins 29 and 30 are provided on the end portion of the chassis 21 to surround the fan 28 and an air flow passage is formed between adjacent pairs of the cooling fins 29 and 30 or between an endmost fin 29 and 30 and an adjacent wall of the cooling portion. The cooling fins 30 are disposed to face an air intake opening 32 which is formed on the upper half body 20a of the case 20 and covered by a protecting net 31. Air introduced into the case 20 through the air intake opening 32 is guided through the cooling fins 30 to the fan 28 from its upper portion 20a.

When the fan 28 is driven by the fan motor 27 so as to cause the cooling portion 26 to operate, the air is introduced into the case 20 through the air intake opening 32 and then guided through the cooling fins 30 to the fan 28. The air is caused by the fan 28 provide an air flow to be exhausted from the side portion of the fan 28 through the air flow passages each formed between adjacent cooling fins 29 or between a fin and an adjacent wall and an air exhaust opening 33 formed on the upper half body 20a of the case 20 to the outside of the case 20. With such an air flow according to the rotation of the fan 28, the chassis 21 is cooled so that heat generated by the power integrated circuit device 25 in contact with the chassis 21 is efficiently radiated through the chassis 21. Therefore, the power integrated circuit device 25 is sufficiently cooled.

Further, as shown in FIG. 1, a battery pack 38 containing batteries is attached to a central portion of the upper half body 20a of the case 20 so as to be detachable therefrom. And, as shown in FIGS. 2A and 2B, an antenna 34 is attached to a lower portion of the upper half body 20a of the case 20 in such a manner as to be raised.

Figure 3:
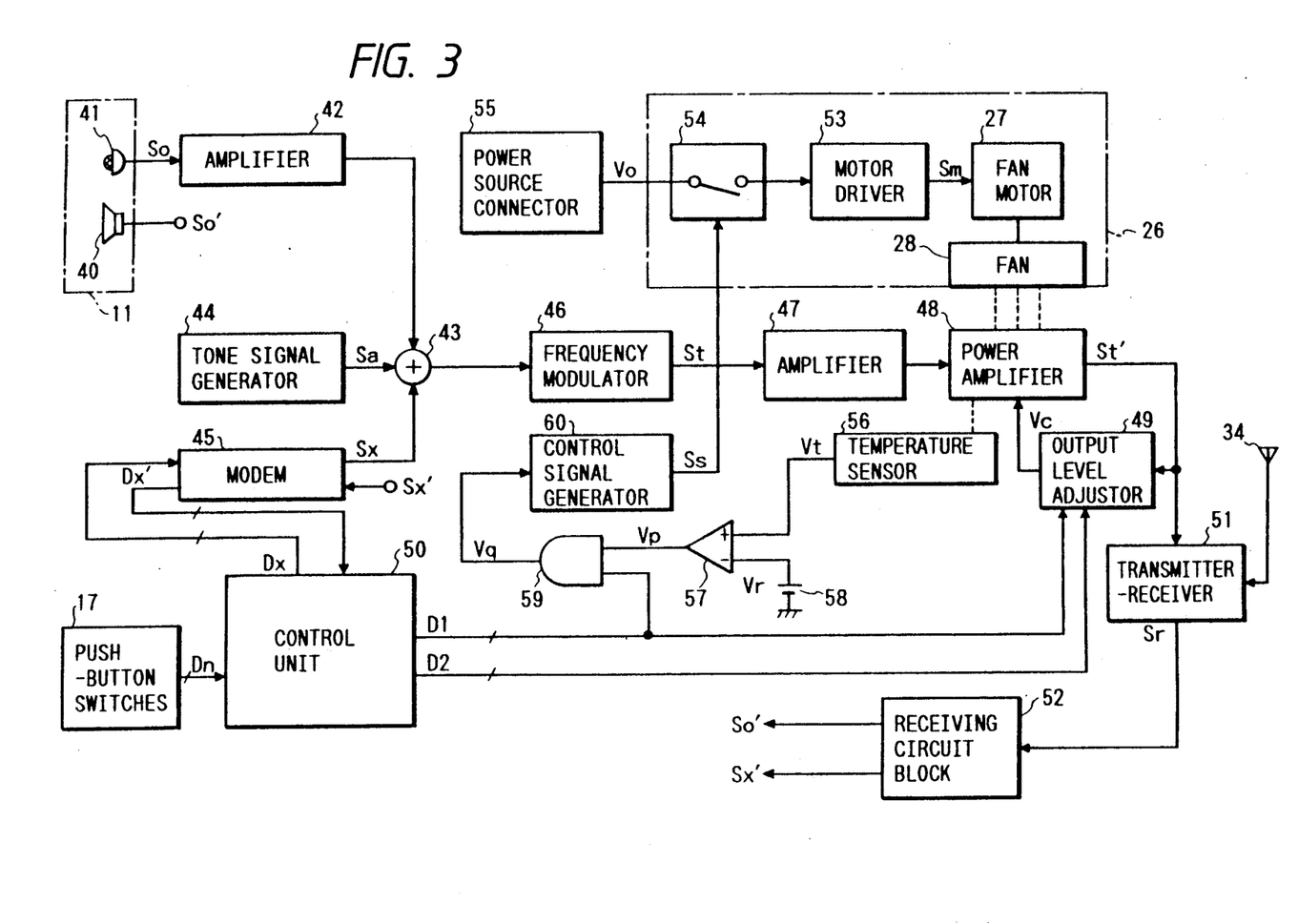
FIG. 3 is a block diagram showing a first example of a communicating circuit configuration employed in the embodiment shown in FIG. 1.

A first example of the communicating circuit configuration comprising the devices, parts and elements provided on the chassis 21 and mounted on the circuit boards 22, 23 and 24 in the embodiment shown in FIG. I is represented by a block diagram shown in FIG. 3.

Referring to FIG. 3, a speech signal So from a microphone 41 contained in the handset 11 is supplied through an amplifier 42 to an adder 43. A tone signal Sa having a predetermined frequency, such as a supervisory audio tone (SAT) signal or a signaling tone (ST) signal, obtained from a tone signal generator 44 is also supplied to the adder 43. Further, digital control data Dx from a control unit 50 is converted into an audio signal Sx by a modem 45 which functions as a modulator and a demodulator selectively as occasion demands. The audio signal Sx obtained from the modem 45 is thus supplied to the adder 43. Accordingly, the inputs to the adder 43 are an amplified speech signal So, a tone frequency Sa, and an audio signal Sx.

The speech signal So and the tone signal Sa or the audio signal Sx are obtained from the adder 43 to be supplied to a frequency modulator 46. The frequency modulator 46 is operative to produce a transmissible signal St by frequency-modulating a carrier having a predetermined frequency with each of the speech signal So and tone signal Sa or audio signal Sx from the adder 43. The transmissible signal St obtained from the frequency modulator 46 is supplied through an amplifier 47 to a power amplifier 48 where the signal St is power amplified.

The power amplifier 48 is contained in the power integrated circuit device 25 constituting the signal transmitting portion as described above and is accompanied with an output level adjustor 49 connected thereto. The output level adjustor 49 is operative to detect a level of a power-amplified transmissible signal St' obtained from the power amplifier 49 to produce a level detection output and to generate a control signal Vc based on the level detection output and digital control data D1 and D2 supplied from the control unit 50. The control signal Vc obtained from the output level adjustor 49 is applied to a control terminal of the power amplifier 48 so that the power amplification for the transmissible signal St performed in the power amplifier 48 is controlled by the control signal Vc.

The digital control data D1 supplied to the output level adjustor 49 from the control unit 50 represent "0" and "1" signal levels selectively so that the output level adjustor 49 generates the control signal Vc which causes the power amplifier 48 to be in its inoperative state when the digital control data D1 represents a logical "0" and the control signal Vc which causes the power amplifier 48 to be in its operating state when the digital control data D1 represent a logical "1". The digital control data D2 supplied also to the output level adjustor 49 from the control unit 50 determine a range of levels wherein the level of the power-amplified transmissible signal St' is adjusted in accordance with the control signal Vc in the power amplifier 48.

The power-amplified transmissible signal St' obtained from the power amplifier 48 is supplied through a transmitter-receiver 51 to the antenna 34 to be transmitted therefrom.

A received signal Sr which is detected by the antenna 34 during a receiving operation is supplied through the transmitter-receiver 51 to a receiving circuit block 52 which produces a received speech signal So' and a received audio signal Sx' based on the received signal Sr.

The received speech signal So' obtained from the receiving circuit block 52 is supplied to a speaker 40 contained in the handset 11 so that received sound is obtained from the speaker 40. Further, the received audio signal Sx' obtained from the receiving circuit block 52 is supplied to the modem 45 to be converted into the received digital control data Dx' and the received digital control data Dx' obtained from the modem 45 is supplied to the control unit 50.

The control unit 50 is further supplied with digital numerical data Dn obtained from one or more of the push-button switches 17 which are manually operated by pushing.

The power amplifier 48 contained in the power integrated circuit device 25 is subjected to cooling by the fan 28 in the cooling portion 26. The cooling portion 26 includes, in addition to the fan motor 27 and the fan 28, a motor driver 53 for supplying the fan motor 27 with a driving signal Sm and a switch 54 for selectively connecting the motor driver 53 with a power source connector 55 to which an external power source is connected. When the switch 54 is in its ON state, the motor driver 53 is connected through the switch 54 to the power source connector 55 so that a power source voltage Vo from the external power source is supplied through the power source connector 55 to the motor driver 53. The motor driver 53 to which the power source voltage Vo is supplied is operative to drive the fan motor 27 with the driving signal Sm so that the fan 28 is rotated by the fan motor 27 for causing the cooling portion 26 to be in operation.

The power amplifier 48 is accompanied with a temperature sensor 56 which is thermally coupled with the power amplifier 48. The temperature sensor 56 is operative to detect the temperature of the power amplifier 48 and to produce a detection output signal Vt corresponding to the detected temperature. The detection output signal Vt obtained from the temperature sensor 56 is compared in level with a reference voltage Vr obtained from a reference voltage source 58 in a level comparator 57. The level of the reference voltage Vr is selected to correspond to the level of the detection output Vt which is obtained from the temperature sensor 56 when the temperature of the power amplifier 48 has reached a lower limit of a range of values within which the power amplifier 48 is required to be cooled.

The level comparator 57 produces an comparison output signal Vp which has a high level when the level of the detection output Vt is equal to or higher than the level of the reference voltage Vr and a low level when the level of the detection output Vt is lower than the level of the reference voltage Vr. The comparison output signal Vp is supplied to an input terminal of an AND gate 59. The digital control data D1 from the control unit 50 is supplied to the other input terminal of the AND gate 59 and a gated output Vq which has a high level only when the digital control data represent "1" and the comparison output Vp obtained from the level comparator 57 has a high level and a low level in other situations is obtained from the AND gate 59. Accordingly, the gated output Vq has a high level only when the power amplifier 48 is in operation with its temperature of a value higher than the lower limit of the values within which the power amplifier 48 is required to be cooled.

The gated output Vq thus obtained from the AND gate 59 is supplied to a control signal generator 60 which is operative to produce a switch control signal Ss having high and low levels in accordance with the high and low levels of the gated output Vq, respectively, and to supply the switch 54 with the switch control signal Ss. The switch 54 is controlled to be in its ON state when the switch control signal Ss has a high level and to be in its OFF state when the switch control signal Ss has a low level. Accordingly, when the switch control signal Ss obtained from the control signal generator 60 has the high level, in other words, the power amplifier 48 is in operation with its temperature of the value higher than the lower limit of the values with which the power amplifier 48 is required to be cooled and therefore the gated output Vq has the high level, the switch 54 is put in the ON state so as to cause the cooling portion 26 to operate and thereby the power amplifier 48 contained in the power integrated circuit device 25 constituting the signal transmitting portion is cooled by force by the fan 28 in the cooling portion 26.

Figures 4, 5A, 5B:
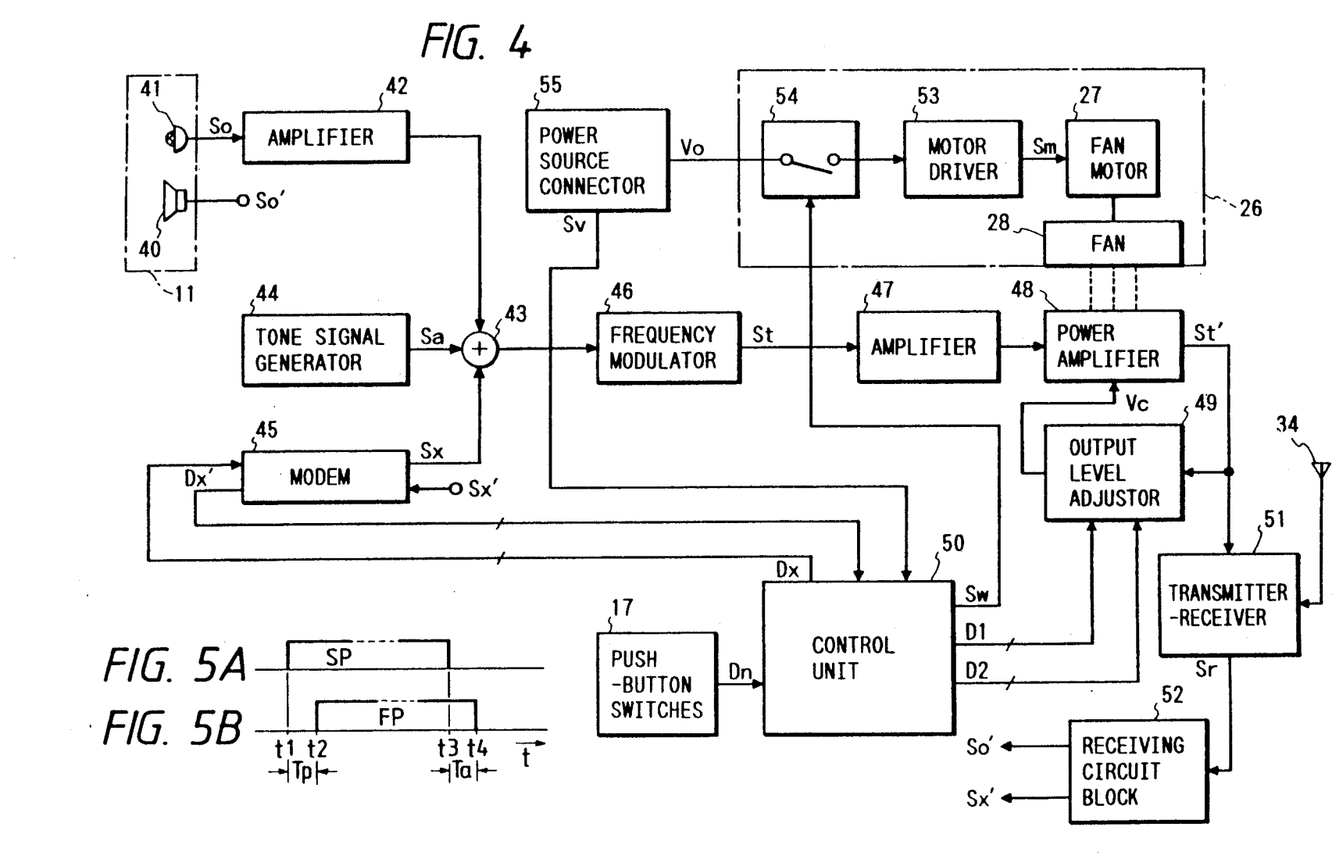
FIG. 4 is a block diagram showing a second example of a communicating circuit configuration employed in the embodiment shown in FIG. 1.
Figs. 5A and 5B are time charts used for explanation of the operation of the second example of a communicating circuit configuration shown in FIG. 4.

A second example of the communicating circuit configuration comprising the devices, parts and elements provided on the chassis 21 and mounted on the circuit boards 22, 23 and 24 in the embodiment shown in FIG. 1 is represented by a block diagram shown in FIG. 4. A large portion of the block diagram shown in FIG. 4 is constructed in the same manner as the block diagram shown in FIG. 3. In FIG. 4, the devices, blocks and signals corresponding to those of FIG. 3 are marked with the same reference numerals so that further descriptions thereof will be omitted.

Referring to FIG. 4, those components corresponding to the temperature sensor 56, the AND gate 59 and the control signal generator 60 employed in FIG. 3 are not provided. Instead, an indicating signal Sv which represents a connecting condition of the external power source to a power source connector 55 is supplied to the control unit 50 from the power source connector 55. Further, a switch control signal Sw is selectively supplied to the switch 54 from the control unit 50. The other portions of the example shown in FIG. 4 are constituted in the same manner as the example shown in FIG. 3.

The switch control signal Sw is selected to have a level corresponding to a high level of the switch control signal Ss in the example of FIG. 3 and therefore the switch 54 is in its ON state when the switch control signal Sw is supplied thereto and in its OFF state when the switch control signal Sw is not supplied thereto.

In the embodiment shown in FIG. 4, the control unit 50 is operative to detect a time point t1 at which digital control data D1 supplied to an output level detector 49 are changed into a state representing "1" from another state representing "0" under a condition wherein the indicating signal Sv from the power source connector 55 indicates that the external power source is connected with the power source connector 55. Therefore, a power amplifier 48 which is contained in the power integrated circuit device 25 constituting the signal transmitting portion starts operating so that a transmitting period SP is commenced, as shown in FIG. 5A. Then, the switch control signal Sw is sent to the switch 54 at a time point t2 to which a predetermined period of time Tp, selected to be, for example, about two minutes, has passed from the time point t1. Therefore, the switch 54 is turned on at the time point t2 to cause the cooling portion 26 to operate so that a fan operating period FP is commenced at the time point t2, as shown in FIG. 5B, and thereby the power amplifier 48 is cooled by force by a fan 28 in the cooling portion 26.

After that, the control unit 50 is operative (1) to detect a time point t3 at which the digital control data D1 supplied to the output level detector 49 are changed into the state representing "0" from the state representing "1" and therefore the power amplifier 48 stops operating so that the transmitting period SP is terminated, as shown in FIG. 5A, and (2) then to stop sending the switch control signal Sw to the switch 54 at a time point t4 to which a predetermined period of time Ta selected to be, for example, about two minutes, has passed from the time point t3. Therefore, the switch 54 is turned off at the time point t4 so as to cause a cooling portion 26 to be inoperative so that the fan operating period FP is terminated at the time point t4, as shown in FIG. 5B. Thereby, the power amplifier 48 is put in its inoperative state without cooling by the fan 28 in the cooling portion 26.

As described above, in the case of the example shown in FIG. 4, the fan operating period FP in which the power amplifier 48 is subjected to cooling by the cooling portion 26 is commenced at the time point t2 delayed by the predetermined period of time Tp from the time point t1 at which the transmitting period SP is commenced and is terminated at the time point t4 delayed by the predetermined period of time Ta from the time point t3 at which the transmitting period SP is terminated. This means that the power amplifier 48 is subjected to cooling by the cooling portion 26 during a period of time from the time point t2 at which the predetermined period of time Tp has passed since the signal transmitting portion commenced to transmit a power-amplified transmissible signal St' to the time point t4 at which the predetermined period of time Ta has passed since the signal transmitting portion terminated to transmit the power-amplified transmissible signal St'.

With such cooling performed by the cooling portion 26, the power amplifier 48 contained in the power integrated circuit device 25 in the signal transmitting portion is efficiently and appropriately cooled by the cooling portion 26 provided with the fan 28 as occasion demands.

Figure 6:
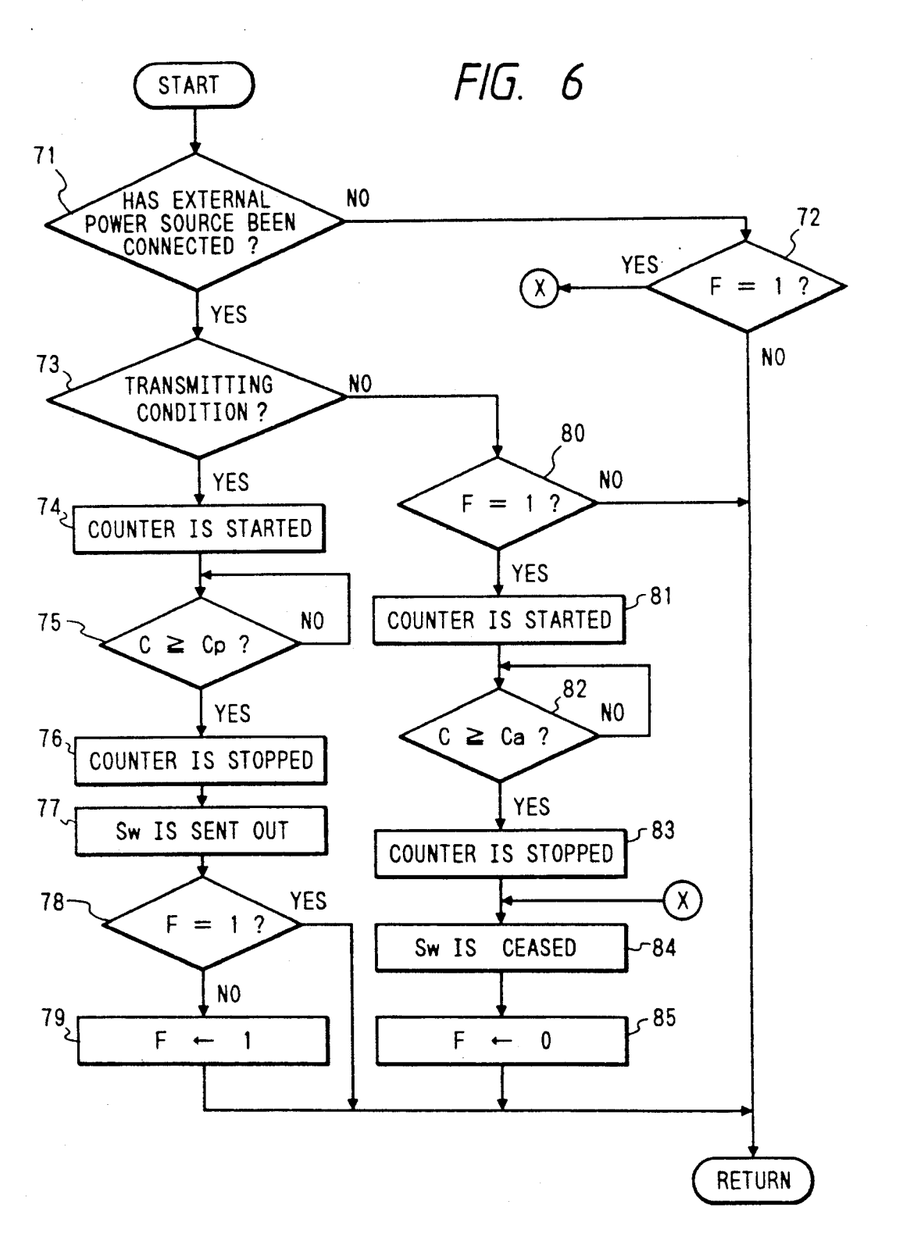
FIG. 6 is a flow chart used for explanation of the operation of the second example of a communicating circuit configuration shown in FIG. 4.

The control unit 50 is constituted, for example, by a microcomputer and one example of an operation program for controlling the cooling portion 26 is carried out in the control unit 50 constituted by the microcomputer in accordance with a flow chart shown in FIG. 6.

According to the flow chart shown in FIG. 6, first, in step 71, it is checked based on the indicating signal Sv whether the external power source has been connected to the power source connector 55 or not. If the external power source has not been connected to the power source connector 55, it is checked whether a flag F represents "1" or not, in step 72. As a result, when the flag F does not represent "1", the process returns to the step 71, and when the flag F represents "1", the process advances to step 84.

If it is clarified in the step 71 that the external power source has been connected to the power source connector 55, it is checked based on the digital control data D1 whether the signal transmitting portion is in a transmitting condition or not, in step 73. If the signal transmitting portion is in the transmitting condition, a counter contained in the control unit 50 is caused to start operating, in step 74. Next, in step 75, it is checked whether a counted resultant C of the counter is equal to or more than a predetermined counted resultant Cp corresponding to a lapse of the predetermined period of time Tp or not. If the counted resultant C of the counter is less than the predetermined counted resultant Cp, the check in the step 75 is repeated.

When it is clarified in the step 75 that the counted resultant C of the counter is equal to or more than the predetermined counted resultant Cp, the counter is caused to stop operating and the counted resultant C of the counter is reset to be 0, in step 76. Then, the switch control signal Sw is commenced to be sent out, in step 77. After that, it is checked whether the flag F represents "1" or not, in step 78. As a result, when the flag F represents "1", the process returns to the step 71, and when the flag F does not represent "1", the flag F is set to be "1" in step 79 and then the process returns to the step 71.

Further, if it is clarified in the step 73 that the signal transmitting portion is not in the transmitting condition, it is checked whether the flag F represents "1" or not, in step 80. As a result, when the flag F does not represent "1", the process returns to the step 71. To the contrary, when the flag F represents "1", the counter contained in the control unit 50 is caused to start operating, in step 81. Next, in step 82, it is checked whether the counted resultant C of the counter is equal to or more than a predetermined counted resultant Ca corresponding to a lapse of the predetermined period of time Ta or not. If the counted resultant C of the counter is less than the predetermined counted resultant Ca, the check in the step 82 is repeated.

When it is clarified in the step 82 that the counted resultant C of the counter is equal to or more than the predetermined counted resultant Ca, the counter is caused to stop operating and the counted resultant C of the counter is reset to be 0, in step 83. Then, the switch control signal Sw is ceased to be sent out in step 84 and the flag F is set to be "0" in step 85. After that, the process returns to the step 71. Thus, the program of FIG. 6 in conjunction with the control unit 50 performs as described above.

What is claimed is:

1. A radio communication apparatus comprising:
   modulating means for modulating a carrier with a signal to be transmitted so as to produce a transmissible signal,
   signal transmitting means for causing the transmissible signal to be subjected to power amplification and then for transmitting the transmissible signal after the transmissible signal was subjected to power amplification,
   cooling means for forcibly cooling a heat source contained in said signal transmitting means,
   condition detecting means for detecting at least one of a temperature condition of said signal transmitting means and an operating condition of said signal transmitting means, and
   operation control means operative to cause said cooling means to be in operation when at least one of a particular temperature condition in which the temperature of said signal transmitting means has exceeded a predetermined value and a particular operating condition in which said signal transmitting means is detected by said condition detecting means to be in a predetermined state.

2. A radio communication apparatus according to claim 1, wherein said condition detecting means comprises a temperature sensor for detecting the temperature condition of said signal transmitting means.

3. A radio communication apparatus according to claim 2, wherein said operation control means is operative to cause said cooling means to be in operation when said particular temperature condition is detected by said condition detecting means under a operating condition in which said signal transmitting means is in operation.

4. A radio communication apparatus according to claim 2, wherein said signal transmitting means comprises a power amplifier for amplifying the transmissible signal obtained from said modulating means and an antenna to which the transmissible signal amplified by said power amplifier is applied, and said temperature sensor is operative to detect temperature of said power amplifier.

5. A radio communication apparatus according to claim 2, wherein said signal transmitting means comprises a power amplifier which is provided for amplifying the transmissible signal obtained from said modulating means and constitutes said heat source contained in the signal transmitting portion and an antenna to which the transmissible signal amplified by said power amplifier is applied, and said cooling means is operative to cool by force said power amplifier.

6. A radio communication apparatus according to claim 5, wherein said cooling means comprises a fan for cooling said power amplifier and a motor for driving said fan.

7. A radio communication apparatus according to claim 6, wherein said operation control means is operative to cause said motor to operate for driving said fan when said particular temperature condition is detected by said condition detecting means.

8. A radio communication apparatus according to claim 7, wherein said operation control means is operative to control the operation of said motor by supplying said motor selectively with a power source voltage from an external power source.

9. A radio communication apparatus according to claim 1, wherein said condition detecting means is operative to detect as said particular operating condition each of a first condition in which said signal transmitting means is for operation in a period of time after a first predetermined period of time has passed since said signal transmitting means commenced operation and a second condition in which said signal transmitting means is inoperative for a period of time after a second predetermined period of time has passed since said signal transmitting means terminated operation.

10. A radio communication apparatus according to claim 9, wherein said operation control means is operative to cause said cooling means to be in operation when said particular operating condition is detected by said condition detecting means under a condition in which a power source voltage from an external power source is able to be supplied to said cooling means.

11. A radio communication apparatus according to claim 9, wherein said signal transmitting means comprises a power amplifier which is provided for amplifying the transmissible signal obtained from said modulating means and includes said heat source contained in the signal transmitting portion and an antenna to which the transmissible signal amplified by said power amplifier is applied, and said cooling means is operative to cool by force said power amplifier.

12. A radio communication apparatus according to claim 11, wherein said cooling means comprises a fan for cooling said power amplifier and a motor for driving said fan.

13. A radio communication apparatus according to claim 12, wherein said operation control means is operative to cause said motor to operate for driving said fan when said particular operating condition is detected by said condition detecting means.

14. A radio communication apparatus according to claim 13, wherein said operation control means is operative to control an operation of said motor by supplying said motor selectively with a power source voltage from an external power source.

15. A radio communication apparatus comprising:
    modulating means for modulating a carrier signal with a signal to be transmitted to produce a transmissible signal;
    signal transmitting means, including a power amplifier, for power amplifying said transmissible signal for transmission;
    cooling means for forcibly cooling a heat source in said signal transmitting means;
    means for detecting a temperature condition of said signal transmitting means; and
    operation control means for causing said cooling means to become operative when said detected temperature condition of said signal transmitting means exceeds a predetermined value.

16. The radio communication apparatus as set forth in claim 15 wherein said temperature sensing means includes a temperature sensor for sensing a temperature of said power amplifier to provide a temperature signal representative of the temperature of said power amplifier; a reference signal; a comparator for comparing said temperature signal with said reference signal to output a digital signal when said temperature signal exceeds said reference signal; and an AND gate for receiving a digital signal and a signal from said control unit indicating that said power amplifier is operating to provide a control signal for operating said cooling means.

17. A radio communication apparatus comprising:
modulating means for modulating a carrier signal with a signal to be transmitted to produce a transmissible signal;
signal transmitting means, including a power amplified, for power amplifying said transmissible signal for transmission;
cooling means for forcibly cooling a heat source in said signal transmitting means;
condition detecting means for determining when said power amplifier is operative, control means acting in response to said condition detecting means, for providing a control signal to said cooling means at a predetermined time Tp after said power amplifier is operative and continuing operation of said cooling means for a second predetermined time Ta after said power amplifier ceases operation, wherein the duty cycle of said cooling means is displaced in time from the duty cycle of said power amplifier.

18. A radio communication apparatus comprising:
modulating means for modulating a carrier with a signal to be transmitted so as to produce a transmissible signal,
signal transmitting means for causing the transmissible signal to be subjected to power amplification and then for transmitting the transmissible signal after the transmissible signal is subjected to power amplification,
cooling means for forcibly cooling a heat source contained in said signal transmitting means,
condition detecting means for detecting at least one of a temperature condition of said signal transmitting means and an operating condition of said signal transmitting means,
power control means for controlling an output power level of said signal transmitting means, and
operation control means operative to cause said cooling means to be in operation when said output power level controlled by said power control means is greater than a predetermined value and a particular operating condition in which said signal transmitting means is detected by said condition detecting means to be in a predetermined state.

19. A radio communication apparatus comprising:
modulating means for modulating a carrier with a signal to be transmitted so as to produce a transmissible signal,
signal transmitting means for causing the transmissible signal to be subjected to power amplification and then for transmitting the transmissible signal after the transmissible signal is subjected to power amplification,
cooling means for forcibly cooling a heat source contained in said signal transmitting means,
condition detecting means for detecting at least one of a temperature condition of said signal transmitting means and an operating condition of said signal transmitting means,
power control means for controlling an output power level of said signal transmitting means, and
means for selectively supplying a power source voltage from an external power source to said power control means,
whereby, when said output power level is controlled by said power control means to a first output power level, said cooling means is operated when a particular operating condition in which said signal transmitting means is detected by said condition detecting means to be in a predetermined state and said power source voltage from an external power source is applied to said power control means; and when said output power level is controlled by said power control means to a second output power level having a magnitude less than the magnitude of said first output power level, said cooling means is shut off when a particular operating condition of said signal transmitting means is detected by said condition detecting means to be in a predetermined state and said power source voltage from an external power source is not applied to said power control means.

* * * * *